United States Patent [19]
Edens

[11] Patent Number: 6,105,305
[45] Date of Patent: Aug. 22, 2000

[54] WELL STRUCTURE

[76] Inventor: David L. Edens, 5103 Elm St., Weston, Wis. 54476

[21] Appl. No.: 09/159,076
[22] Filed: Sep. 22, 1998
[51] Int. Cl.[7] .................................................. A01K 97/20
[52] U.S. Cl. .............................. 43/54.1; 43/55; 224/406
[58] Field of Search .................... 43/54.1, 55; 114/343, 114/347; 383/23, 76, 95, 120; 224/406, 572, 563

[56] References Cited

U.S. PATENT DOCUMENTS

| | | | |
|---|---|---|---|
| 268,558 | 12/1882 | Small | 43/55 |
| 368,091 | 8/1887 | Jamieson | 43/54.1 |
| 636,381 | 11/1899 | Hamel | 43/55 |
| 669,751 | 3/1901 | Joyce | 114/343 |
| 1,419,549 | 6/1922 | Fearnow | 114/343 |
| 1,629,723 | 5/1927 | Moler | 383/76 |
| 1,700,315 | 1/1929 | Hopkins | 43/54.1 |
| 1,725,864 | 8/1929 | James | 43/55 |
| 1,844,872 | 2/1932 | Shipman | 383/23 |
| 1,869,071 | 7/1932 | McLean | 43/55 |
| 1,928,153 | 9/1933 | Hess | 383/23 |
| 2,018,606 | 10/1935 | Cumings | 43/54.1 |
| 2,030,793 | 2/1936 | Horn | 43/55 |
| 2,057,836 | 10/1936 | Leonardson | 383/23 |
| 2,064,696 | 12/1936 | Smith et al. | 43/55 |
| 2,165,869 | 7/1939 | Mathiesen | 383/23 |
| 2,186,384 | 1/1940 | Lester | 383/76 |
| 2,203,565 | 6/1940 | Field | 43/55 |
| 2,253,688 | 8/1941 | Collins | 43/55 |
| 2,323,318 | 7/1943 | Farkas | 43/55 |
| 2,377,311 | 6/1945 | Campbell | 43/55 |
| 2,447,940 | 8/1948 | Holland | 383/76 |
| 2,481,618 | 9/1949 | Rockhill | 43/54.1 |
| 2,678,672 | 5/1954 | Spilman | 383/76 |
| 2,832,116 | 4/1958 | Clevett, Jr. et al. | 383/76 |
| 3,053,005 | 9/1962 | Byers | 43/55 |
| 3,275,053 | 9/1966 | Kabana | 383/95 |
| 3,552,613 | 1/1971 | Nye | 224/406 |
| 3,590,423 | 7/1971 | Messer | 43/55 |
| 3,674,188 | 7/1972 | Anderson | 43/55 |
| 3,691,572 | 9/1972 | Yannes, Jr. | 114/347 |
| 3,716,938 | 2/1973 | Ammons | 43/55 |
| 3,958,289 | 5/1976 | Carlson | 114/347 |
| 3,988,853 | 11/1976 | Hudkins | 43/55 |
| 4,079,767 | 3/1978 | Howard | 383/95 |
| 4,139,037 | 2/1979 | McGuigan | 383/23 |
| 4,140,163 | 2/1979 | Usner | 383/23 |
| 4,174,585 | 11/1979 | Beesley | 43/55 |
| 4,186,859 | 2/1980 | Frankfort et al. | 224/572 |
| 4,228,834 | 10/1980 | Desnick | 383/95 |
| 4,398,488 | 8/1983 | Mathieu | 114/343 |
| 4,523,357 | 6/1985 | Widditsch | 383/23 |
| 4,593,642 | 6/1986 | Shay | 114/347 |
| 4,630,312 | 12/1986 | Milstein | 383/120 |
| 4,642,934 | 2/1987 | Carlson et al. | 43/55 |

(List continued on next page.)

Primary Examiner—Michael J. Carone
Assistant Examiner—Darren W. Ark
Attorney, Agent, or Firm—Merchant & Gould P.C.

[57] ABSTRACT

A well structure useful for keeping fish alive while fishing or for storing personal belongs while boating is described. The well structure includes a container defining a well cavity, the container including a flexible, water retaining material, a first top container edge and an opposing second top container edge. Support fasteners are attached to both ends of the first and second top container edges and configured to removably attach to a rigid structure. The support fasteners are positionable to bring the first and second top container edges together in a closed position and the support fasteners are positionable to maintain the first and second top container edges apart in an open position. The well structure preferably includes a work surface panel that extends between the first and second container edges when the container is in the open position.

22 Claims, 4 Drawing Sheets

U.S. PATENT DOCUMENTS

| | | | |
|---|---|---|---|
| 4,648,121 | 3/1987 | Lowe | 383/76 |
| 4,685,570 | 8/1987 | Medow | 383/95 |
| 4,724,791 | 2/1988 | McSorley | 114/343 |
| 4,815,411 | 3/1989 | Burgess | 114/343 |
| 4,878,311 | 11/1989 | Cano | 43/54.1 |
| 4,974,760 | 12/1990 | Miller | 224/572 |
| 4,988,216 | 1/1991 | Lyman | 383/76 |
| 5,050,526 | 9/1991 | Nelson et al. | 114/364 |
| 5,076,711 | 12/1991 | Koehler, Jr. | 43/55 |
| 5,165,198 | 11/1992 | Kilian, III | 43/55 |
| 5,191,732 | 3/1993 | Berdinsky et al. | 43/55 |
| 5,265,960 | 11/1993 | Shikler | 383/95 |
| 5,267,410 | 12/1993 | Peyatt | 43/57 |
| 5,326,576 | 7/1994 | Zuege | 383/95 |
| 5,481,822 | 1/1996 | Engels | 43/54.1 |
| 5,503,476 | 4/1996 | Hamdan | 383/23 |
| 5,605,112 | 2/1997 | Schuman | 114/343 |
| 5,662,061 | 9/1997 | Salathe | 114/347 |
| 5,722,197 | 3/1998 | Albritton | 43/55 |
| 5,803,325 | 9/1998 | Wang | 224/572 |
| 5,845,994 | 12/1998 | Rice | 383/76 |
| 5,882,117 | 3/1999 | Laffon | 383/120 |
| 5,970,652 | 10/1999 | Hohmann | 43/55 |

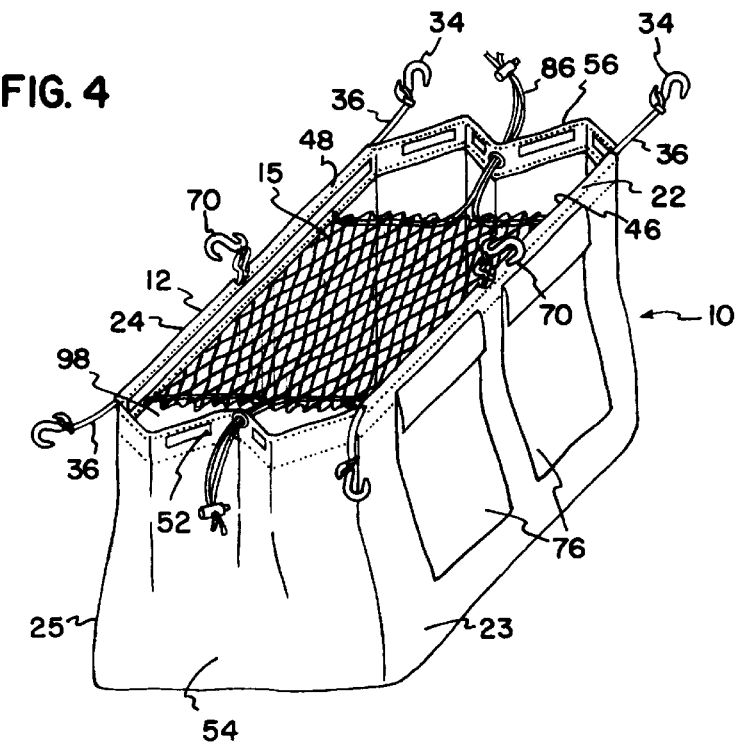
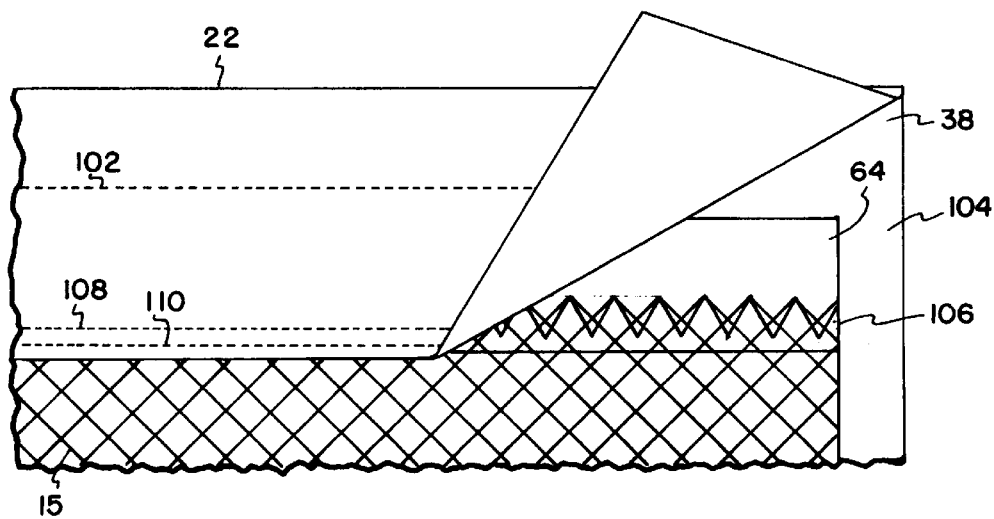

WELL STRUCTURE

FIELD OF THE INVENTION

This invention relates generally to lightweight flexible containers and more particularly to a well structure for use in a canoe to keep fish alive and cool once caught.

BACKGROUND OF THE INVENTION

When fishing, it is often desirable to keep the fish caught alive for an extended period of time, to preserve their freshness. Many devices for keeping fish alive while fishing are known.

A stringer is one way to lengthen the lives of caught fish. Fish may be attached to a device that is submerged in the water and attached to the boat. However, stringers can come untied from the boat, be knocked off with a canoe paddle, be lost to a motor, or cause the boat to tip, among other problems.

Another fishing device is a live well for inside the boat. For example, fish buckets are known and may include an inner and an outer cylinder having insulation between them. Likewise, rigid live wells are known for use in a boat that may have a cross section approximately equal to the cross section of a fishing boat. However, both of these devices are rigid and bulky, which is inconvenient for transporting and storing.

Often, fishing is combined with another popular pastime, canoeing. The above described storage devices are particularly inconvenient for use in a canoe because of their bulk and rigidity. Stability is of the utmost importance for objects placed within canoes. For containers filled with water and live fish, stability of the container is especially important to preserve the fish and prevent packs and other objects in the canoe from being soaked with water. The effect of the container on the canoe's stability is also important, because shifts in weight within a canoe can cause the canoe to tip over.

Ease in transport is also of considerable importance on canoe trips, such as camping canoe trips. Often a day's canoeing covers several lakes or streams interspersed with substantial portaging, during which all objects must be carried. Minimizing the number of additional objects to be carried is desirable. Stand alone containers are undesirable because they are bulky and heavy, thereby significantly complicating the portage. When not in use, these stand alone containers are difficult to store and will probably need to be carried separately.

Accordingly, the main objective of the present invention is to provide a device for storing and carrying live fish which solves these problems.

SUMMARY OF THE INVENTION

The present invention provides a lightweight, flexible, and water-retaining well structure for keeping fish alive and cool after they have been caught. The well structure includes a container that defines a well cavity and includes two opposing top edges. Support fasteners are attached to both ends of the two opposing edges and are configured to removably attach to a rigid structure, such as a canoe gunwhale. The support fasteners can be moved together to bring the two opposing edges into close contact in order to close the container, keeping fish and water inside the well structure or creating a dry storage container for cameras and other belongings. The support fasteners can also be positioned to hold the two opposing edges apart in an open position which is convenient for loading fish or belongings into the well structure or for adding or changing the water to preserve captured fish.

The well structure preferably further includes a flexible work surface extending between two opposing edges of the container. Preferably, the work surface is a panel of netting, fabric, or flexible plastic which can be easily cleaned and will suffer little or no water damage. By moving the support fasteners apart to maintain the container in an open position, the panel forms a work surface which is convenient for unhooking fish before placing them in the container.

The present invention provides a lightweight flexible fish live well which can be connected to a canoe and rests on the bottom of the canoe, taking up minimal space and keeping the weight low in the canoe to improve stability. The flexible well structure of the present invention is readily transported, stored and cleaned. When the well structure is empty, it can be left attached to the canoe during portage.

BRIEF DESCRIPTION OF THE DRAWINGS

For a more thorough understanding of this invention and its many advantages, reference should be had to the accompanying drawings as follows:

FIG. 4 shows a side perspective view of the well structure of FIG. 1 while the well structure is being moved between the closed position and the open position.

FIG. 6 shows an exploded detail view of a top edge of the well structure of FIG. 1 during assembly.

DETAILED DESCRIPTION OF THE PREFERRED EMBODIMENT

Figure 1:
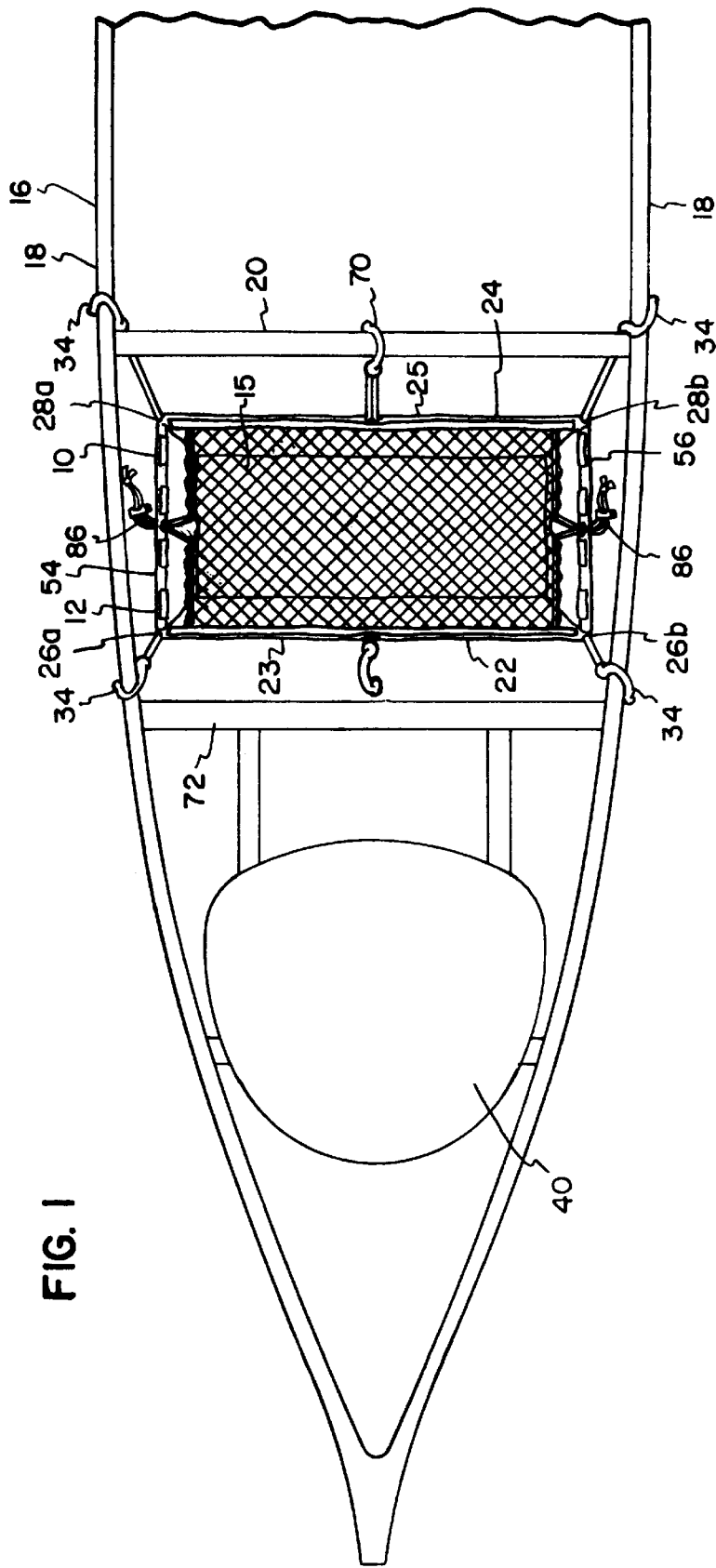
FIG. 1 shows an overhead view of the well structure of the present invention attached to a canoe in an open position.

This invention provides a flexible well structure for use in boat, and especially suited for use in a canoe. The well structure can be used to keep fish alive and cool after they have been caught. The well structure is also suited to holding personal belongings such as cameras, sun glasses, or clothing in a canoe. As shown in FIG. 1, the well structure 10 includes a flexible container 12 defining a well cavity 14 for storing live fish or personal belongings.

In FIG. 1, the well structure 10 is shown attached to a canoe 16 by being hooked to the canoe edge, or gunwhale, 18. The well structure 10 may also be supported by a bar that joins opposing canoe gunwhales, the thwart 20. The well structure 10 includes two opposing top edges 22, 24 that reach across the width of the canoe 16 when the well structure 10 is attached to the canoe. Each opposing top edge 22, 24 has two ends 26a and 26b, and 28a and 28b, shown in FIG. 3. Support fasteners 34 are attached to both ends 26a and 26b, and 28a and 28b, of the two opposing edges 22, 24 and are configured to removably attach to a rigid structure, such as a canoe gunwhale 18. In a preferred embodiment, the well structure 10 may include a work surface panel 15 that extends between the top edges 22, 24 when the well structure is in an open position, as illustrated in FIG. 1.

Figure 3:
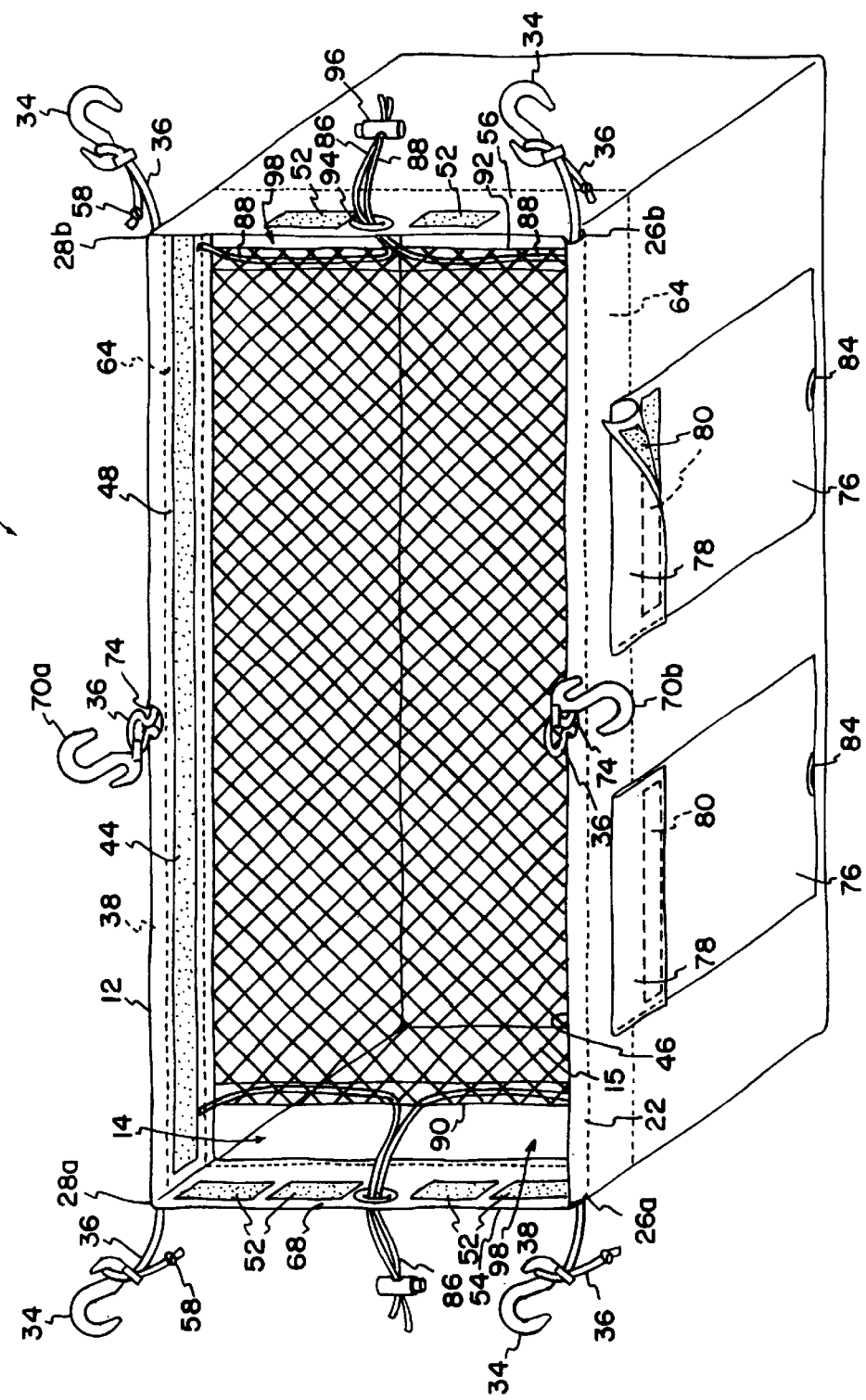
FIG. 3 shows a top perspective view of the well structure of FIG. 1 in the open position.

Now referring to FIG. 3, the top opposing edges 22, 24 may include a cord 36 that is sewn into a channel 38 of the top opposing edges. The cord 36 is preferably elastic. Preferably, the support fasteners 34 are attached to the ends of the cord 36. The support fasteners 34 are preferably designed to allow adjustment of their distance from the well structure along the cord 36, thereby allowing adjustment to different boat configurations and different levels of tension in the top opposing edges 22, 24.

For purposes of discussing specific sides of the well structure, a front side 23 will be considered the side that is closest to the person using the well structure in the canoe, or the side that is closest to the canoe seat 40 in FIG. 1, in the preferred use of the well structure. The front side 23 includes the front top edge 22. A back side 25 is the side farthest away from the canoe seat 40 in FIG. 1. The back side 25 includes back top edge 24. The front top edge 22 has opposing ends 26a and 26b. The back top edge has opposing ends 28a and 28b.

The well structure 10 can be positioned in an open position, for placing fish and water in the well cavity 14 or for removing fish from the well cavity 14. In the open position, as illustrated in FIG. 1, the two support fasteners 34 at ends 26a and 28a, which are on the same side of the canoe, are attached to the canoe gunwhale 18 at some distance from each other, thereby holding the well cavity 14 open. The two support fasteners 34 at ends 26b and 28b are also positioned at a distance from each other.

Figure 2:
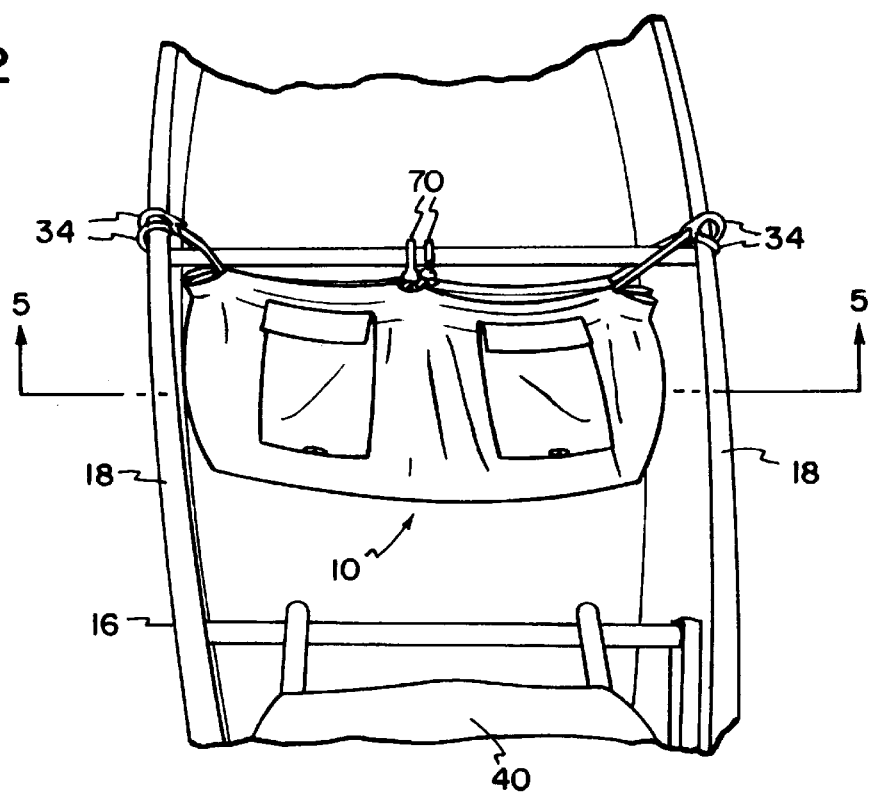
FIG. 2 shows a top perspective view of the well structure of FIG. 1 attached to a canoe in a closed position.
Figure 5:
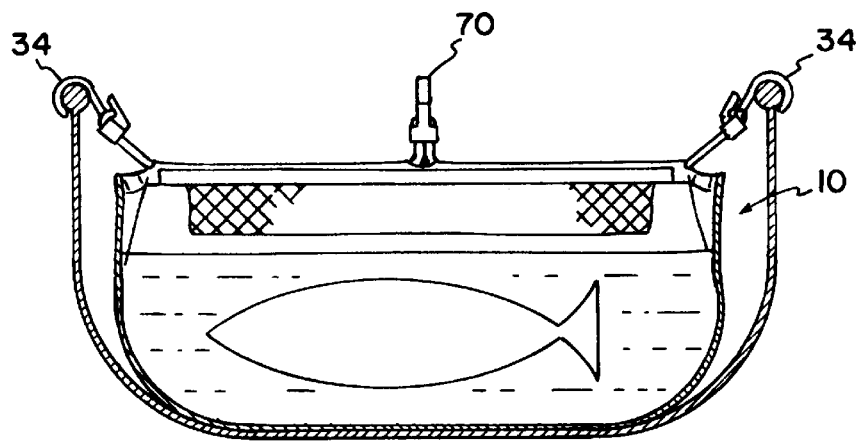
FIG. 5 shows a front view of the well structure of FIG. 1 that is removably attached to a canoe and configured in a closed position.

The well structure 10 can also be positioned in a closed position, as illustrated in FIG. 2. In the closed position, fish are shaded from the sun and the fish are unable to splash water out of the well cavity or jump out of the well cavity. Further, the well structure 10 occupies less space in the canoe when in the closed position. To place the well structure in the closed position, the support fasteners 34 are moved close to each other on the gunwhale 18, or are moved so that the cords at each end overlap each other. The top opposing edges 22, 24 are thereby brought in close contact with each other.

Additional features may serve to hold the well structure 10 more securely in the closed position. The preferred embodiment includes a fastener 44 as shown in FIG. 3 configured to attach the two top edges 22, 24 along their inner surfaces 46, 48. When engaged, the fastener 44 retains the first and second top edges 22, 24 in a closed position. Preferably, the fastener 44 comprises a hook and loop type fastener. A strip of the hook material may be situated along the inner surface 46 of the front top edge 22, while a strip of the loop material may be attached along the inner surface 48 of the opposing top edges 24, or vice versa. Many other embodiments of the fastener 44 are possible that serve to hold the top edges 22, 24 together, and are contemplated by this invention. Snaps, buttons, hooks, clips, different shapes and sizes of hook and loop type material or other attachment devices may also be included in or serve as the fastener 44, for example.

The preferred embodiment further comprises a closure device 52 to hold ends 54, 56 of the well structure 10 in a closed position. Where the ends 54, 56 are made of a flexible material, they may bulge out, allowing water to spill, when the well structure 10 is in a closed position. In one embodiment illustrated in FIG. 4, the closure device 52 may be configured to hold the ends 54, 56 in a folded position. In this example, the closure device 52 consists of pieces of hook and loop type fastener positioned on the inner and outer surfaces of the ends 54, 56. Many other configurations of the closure device 52 are possible and are contemplated by this invention, such as snaps, hooks, clips, buttons different shapes and sizes of hook and loop type, or other attachment devices that retain the ends 54, 56 in a closed position. For example, the closure device could alternatively include a line running along or through the top edge of the ends 54, 56 and a sliding lock mechanism placed on the line to cinch the top edges of the ends 54, 56.

Further, as shown in FIGS. 1 and 3, a side cincher 86 may be included in the well structure 10, to control the size of side openings 98 between the work surface panel 15 and the container ends 54, 56. In the preferred embodiment, the side cincher 86 is present at both ends 54, 56 of the container 12. Each side cincher 86 may include two lines 88 that are each stitched to the inner surface of one of the first and second container sides. The work surface panel 15 includes two side edges, 90 and 92. The lines 88 are attached to the side edges 90, 92 of the work surface panel 15. Where the work surface panel 15 is made of netting, for example, the lines 88 may be attached to the netting edges by passing through the netting openings. On each side, the lines both pass through a grommet 94 at the top of the container end 54 or 56. A lock 96 is included on the two lines 88 on the outer side of the grommet 94, and is used to adjust the distance allowed between the side edges 90, 92 of the work surface panel 15 and the container ends 54, 56.

The lock 96 may be moved out along the lines 88 away from the container to widen the opening 98. The lock 96 may be moved along the lines 88 toward the container to narrow the opening 98. A side cincher 86 of a different configuration may also be included in the present invention, where the side cincher 86 serves to control the side openings 98.

By moving the support fasteners 34 apart to maintain the container in an open position, the work surface panel 15 is formed which can be used to unhook fish before placing them in the well cavity 14. The work surface panel 15 may be made of a material that can be situated inside of the well cavity when the well structure is in the closed position, and can tolerate exposure to water. More preferably, the panel 15 can be easily cleaned. The work surface panel 15 may be a flexible piece of material, such as netting, fabric, or flexible plastic. In the preferred embodiment, the work surface panel 15 is sewn into the top edges 22, 24, and is not directly attached to the ends 54, 56. The work surface panel 15 preferably includes nylon netting about 17 inches by 24 inches. The netting size is preferably about two inches to ⅛ inch, most preferably about ¼ inch.

In a preferred embodiment, the container 12 includes a water-retaining, flexible fabric, most preferably being used in all four sides of the container. More preferably, the container 12 is made of a durable fabric with a rubber backing, providing a flexible, lightweight, and virtually waterproof well cavity. Still more preferably, the fabric is nylon, canvas, or polyester, forming a durable well cavity 14 which is easily cleaned. One preferred fabric is Ultrex™ fabric manufactured by Burlington Industries of New York, which has a microporous coating. Another possible fabric choice is a material made of poly vinyl chloride.

Seams inside of the well cavity 14 are preferably sealed to prevent water leakage, as is known in the art. Preferably the interior seams of the well cavity 14 are sealed with seam seal tape, as available from Man Industries, Framingham, Mass.

As shown in FIG. 3, the cords 36 may run through a channel 38 formed in each top edge 22, 24, and attach to the support fasteners 34. FIG. 6 illustrates the overlap area during assembly, before the fastener 44 is affixed and before the cord 36 is run through the channel 38. The channel 38 is formed at an overlap 104 of the container material that is stitched closed along a stitch line 102. The overlap 104 may be about ½ to 2 inches deep, preferrably ¾ inch deep. The cords thereby provide a flexible means for removable attachment to a rigid structure. The cords 36 also simplify the task of carrying the well structure 10 on land, as a user can grasp the cords to carry the well structure during portaging.

The cords 36 preferably comprise elastic cords. The cords 36 include ends 58. The cord ends 58 are preferably prevented from fraying by knotting the ends, as shown in FIG. 3, or by attaching locks to the cord ends 58. The cord 36 used on each top edge 22, 24 may be about 30 to 45 inches long, more preferably 38 inches long, and about ⅜ inch in diameter, in one preferred embodiment.

The preferred embodiment further comprises a band 64 which is attached to the container 12 around the container's perimeter, reinforcing the container edges 22, 24 and end edges 66, 68. The band is shown being sewn in during assembly of the top edges in FIG. 6. More preferably, the band 64 comprises nylon webbing and is attached about one inch or less below the cords 36. The band 64 may be sewn into a doubled over portion 104 of the material at the top edges of the container. Preferably, the band 64 is about one inch wide and ¹⁄₁₆ inch thick.

When the top opposing edges 22, 24 are sewn, the work surface panel is preferably stitched to the edges at the same time as the nylon band 64. The band 64 and a doubled-over portion of the work surface panel 15 define an overlap area 106, and are stitched along stitching lines 108 and 110.

The preferred embodiment still further comprises additional support fasteners 70 attached to the top edges 22, 24, where the two additional support fasteners 70 are configured to removably attach to a rigid structure. As shown in FIG. 2, these additional support fasteners 70 can be fastened to the canoe thwart 20 to close the well structure 10 while it sits inside the canoe in order to protect its contents. The additional support fasteners 70 can also be fastened to the top container edges 22, 24 to close the well structure 10 in order to protect its contents while carrying it outside the canoe. When the container 12 is open, the additional support fastener 70 at the back top edge 24 may be attached to the thwart 20 to hold up the back top edge 24. To hold the container open as far as possible, the additional support fastener 70 may be attached to another structure such as a second thwart 72, if the boat or canoe has a second thwart 72 in an appropriate position.

Preferably the additional support fasteners 70 may be strong, lightweight adjustable hooks similar or identical to the support fasteners 34. The additional support fasteners 70 are preferably positioned in the middle of the top edges 22, 24 and attach to the cords 36 through openings 74 in the top edges 22, 24, situated roughly in the center of each top container edge 22, 24. Preferably, support fasteners 36 and additional support fasteners 70 are adjustable plastic hooks, as made, for example by Bungee International Manufacturing under product name APH 9. Alternatively, the additional support fasteners could be straps, with one end attached to a top edge and the other end capable of looping over the thwart 20 and attaching to the strap. A hook and loop fastener could be used for this attachment, for example.

In another preferred embodiment, the well structure 10 further comprises at least one pocket 76 that is attached to an outer surface of one of the container sides. The pocket 16 can be used to store an aerator to provide oxygen to the well cavity, a fishing license, sunglasses, or other items. The exemplary embodiment includes two pockets 76 stitched to the outer surface of the front container side 23. The pockets 76 may then be easily reached by the canoeist. In an alternative embodiment, pockets may be attached to the outer surface of one or both of the two container ends 54, 56.

As shown in FIG. 3, the pocket 76 may include an upper flap 78 and a fastener 80. Preferably, the fastener 80 is a flexible hook and loop type fastener, about 4 to 6 inches long, and the pocket 76 is made of the same material as the container 12 defining the well cavity. The pocket 76 may also have a grommet 84 at its bottom edge, providing a small opening for allowing water to drain, and providing air flow into the pocket 76. Other devices for providing an opening to the pocket 76 are also possible.

The pocket 76 may have many different configurations. Preferably, the pocket 76 is made of one piece of material, folded and stitched at the sides of the material to form the pocket cavity. One end of the material may form the upper flap 78. In this preferred embodiment, the pocket is attached to the container at the top edge of the pocket.

In an exemplary embodiment, the well structure defines a well cavity 14 about 12.5 inches wide, 12 inches deep, and 26 inches long in the open position. The well cavity 14 of this embodiment holds about 5 to 10 gallons. At 10 gallons, the water may be close to the top of the container so that some splashing over is possible, while at 7 gallons, the water level is easier to work with. The container 12 may be assembled from a piece of material about 52 inches by 38.5 inches.

To attach the well structure to a canoe or similarly sized boat, the additional support fastener 70 at the back top edge 24 of the container can be attached to a thwart 20. Then the support fasteners 34 at the ends 26a and b, 28a and b of the top edges can be attached to the gunwhales. The hooks 34 at the ends 28a and b of the back top edge 24 can be placed under the thwart 20 and attached to the gunwhales forward of the thwart 20. The hooks 34 at the ends 26a and b of the front top edge 22 are then placed on the gunwhales aft of the thwart 20. The second additional support fastener 70 on the front top edge 22 can be placed on the thwart next to the first additional support fastener.

When a fish is caught, the well structure can be moved to the open position by unhooking the second additional support fastener 70b from the thwart, as shown in FIG. 3. Then the support fasteners attached to the front top edge 22 are moved aft along the gunwhales, spreading out the work surface panel. The fish can be brought into the boat and placed on the work surface for removing the hook. When the hook is removed, the fish is placed in the bottom of the well structure through the opening 98 between the work surface panel 15 and one of the ends 54, 56 of the container 12. Water is then added to the well cavity. The well structure 10 can be moved to the closed position as discussed above, protecting the fish from the sun, preventing the fish from jumping out of the well cavity 14, and guarding against water splashing out and spilling the contents.

By changing the water frequently, the fish can be kept alive and fresh for extended periods of time. Water can be changed by a person in the canoe by using a scoop or cup to remove part of the water from the well cavity 14, and adding fresh water from the lake or river.

When the canoe is portaged, the well structure can be picked up by grasping the cords 36 and support fasteners 34 at the ends of the top edges 22, 24. The well structure can be lightened for the portage by lowering one end 54, 56 of the container to let out some water. When empty or filled with lightweight personal belongings, the well structure can remain attached to the canoe during portaging, reducing the number of items the canoers must carry.

The well structure of the present invention is also useful when it is time to clean the catch away from camp. The canoer can bring along the well structure with the catch, and a pan for the fillets, to a point or island away from camp. It is important to clean the catch at a point distant from the camp to avoid drawing animals to the campsite with the odor and bones caused by cleaning the fish. The canoer may take the fish out of the well structure one at a time, placing the fillets in the pan as they are prepared. When finished, the well structure can be thoroughly rinsed out, and the pan can be placed on the work surface panel inside the well structure for the trip back to camp. The well structure can be hung up to dry at the end of use each day.

The present invention offers a further advantage in that the flexible well structure sags slightly when filled with water and fish, causing the well structure to rest very near or on the bottom of the canoe or boat. Thus, the weight is low in the canoe, providing stability to the canoe and to the container contents. Contact through the relatively thin container wall with the bottom of the canoe helps to keep the fish cool.

Although the well structure of the present invention has been discussed in the context of fishing and storing fish, it is also possible to use the well structure for many other purposes while canoeing or boating, and these uses are contemplated by the present invention. For example, the well structure of the present invention is convenient for storing personal items and clothing while canoeing or boating. The well structure is easy to access for retrieving foul weather gear, sunglasses, sun screen lotion, or a water bottle, for example, during a canoe trip. By hanging below a thwart, the well structure does not occupy a significant amount of space in the canoe. The work surface 15 provides a resting place for personal items at the top of the well cavity 14 that is especially convenient for frequently accessed items.

The present invention has been discussed primarily in connection with a canoe. However, it is also possible to utilize the present invention in other types of boats or vehicles that have appropriate attachment points for the support fasteners.

While particular embodiments of the invention have been discussed, it should be understood that this invention is not limited thereto as modifications may be made by those skilled in the art, particularly in light of the foregoing teachings. Accordingly, the appended claims contemplate coverage of any such modifications as incorporate the essential features of these improvements within the true spirit and scope of the invention.

We claim:

1. A well structure, comprising:
   a container defining a well cavity, the container including a watertight, flexible material, a first top container edge and a second top container edge, the first and second top container edges being situated opposite each other and each edge having two ends and a length;
   a support fastener attached to each end of both the first and second top container edges and configured to removably attach to a rigid structure, wherein the support fasteners are positionable to bring the first and second top container edges together in a closed position and the support fasteners are positionable to maintain the first and second top container edges apart in an open position; and
   a work surface panel comprising a first panel edge attached to the first container edge and a second panel edge situated opposite to the first panel edge the second panel edge attached to the second container edge, wherein the panel extends between the first and second container edges when the container is in the open position.

2. The well structure of claim 1 wherein the panel comprises a material selected from the group of netting, fabric, and flexible plastic.

3. The well structure of claim 1 wherein the support fasteners comprise hooks.

4. The well structure of claim 3 wherein the support fasteners comprise plastic hooks.

5. The well structure of claim 1 further comprising a first cord attached along the length of the first container edge and a second cord attached along the length of the second container edge, the support fasteners being attached to the first and second cords, whereby the first and second cords provide support for the first and second container edges and a device for carrying the well structure.

6. The well structure of claim 5 wherein the cords comprise elastic cords.

7. The well structure of claim 1 further comprising a band attached to the first and second container edges, reinforcing the container edges.

8. The well structure of claim 7 wherein the band comprises nylon.

9. The well structure of claim 1 further comprising:
   a first additional support fastener attached along the first top container edge; and
   a second additional support fastener attached along the second top container edge; the first and second additional support fasteners being configured to removably attach to a rigid structure, whereby the first and second additional support fasteners are positionable to maintain the first and second container edges together in the closed position.

10. The well structure of claim 9 wherein the first and second additional support fasteners comprise hooks.

11. The well structure of claim 9 wherein the first and second additional support fasteners comprise plastic hooks.

12. The well structure of claim 9 wherein the first and second additional support fasteners comprise straps.

13. The well structure of claim 1 wherein the container is about 26 inches long along the first and second top container edges, about 12.5 inches wide, and about 12 inches deep.

14. The well structure of claim 1 wherein the container includes five sides of a flexible, watertight material.

15. The well structure of claim 14 wherein the flexible material of the container comprises a fabric selected from the group of nylon, canvas, and polyester.

16. The well structure according to claim 15 wherein the flexible material further comprises a water proofing element selected from the group of a rubber layer, a microporous coating and a plastic layer.

17. The well structure of claim 1 the container further comprising a third top container edge and a fourth top container edge, the third and fourth top container edges extending between the first and second top container edges, the well structure further comprising:
   a first closure device on the third top edge of the container, configured to retain the third edge in a folded position when the first and second top edges are in the closed position;
   a second closure device on the fourth top edge of the container, configured to retain the fourth edge in a folded position when the first and second edges are in the closed position.

18. The well structure of claim 17 wherein the first and second closure devices comprise flexible hook and loop fasteners.

19. The well structure of claim 1, the container further comprising a first container side and a second container side, extending from the first and second top container edges, the first and second container sides each having an outer surface, the well structure further comprising at least one pocket on the outer surface of the first container side.

20. The well structure of claim 1 the container further comprising a third container side and a fourth container side, extending between the first and second top container edges, the third and fourth sides each having an outer surface, the well structure further comprising a pocket attached to the outer surface of the third side of the container.

21. The well structure of claim 1 further comprising a fastener positioned to attach an inner surface of the first top container edge to an inner surface of the second top container edge, whereby the fastener assists in retaining the first and second top edges in the closed position.

22. The well structure of claim 21, wherein the fastener comprises a hook and loop fastener.

* * * * *